(12) United States Patent
Legzdins

(10) Patent No.: US 9,890,064 B2
(45) Date of Patent: Feb. 13, 2018

(54) METHOD FOR IMPARTING FILTERING CAPABILITY IN ELECTROLYTIC CELL FOR WASTEWATER TREATMENT

(71) Applicant: Axine Water Technologies Inc., Vancouver (CA)

(72) Inventor: Colleen Legzdins, West Vancouver (CA)

(73) Assignee: Axine Water Technologies Inc., Vancouver, BC (CA)

(*) Notice: Subject to any disclaimer, the term of this patent is extended or adjusted under 35 U.S.C. 154(b) by 427 days.

(21) Appl. No.: 14/648,398

(22) PCT Filed: Nov. 25, 2013

(86) PCT No.: PCT/CA2013/050897
§ 371 (c)(1),
(2) Date: May 29, 2015

(87) PCT Pub. No.: WO2014/082170
PCT Pub. Date: Jun. 5, 2014

(65) Prior Publication Data
US 2015/0321929 A1 Nov. 12, 2015

Related U.S. Application Data

(60) Provisional application No. 61/732,366, filed on Dec. 2, 2012.

(51) Int. Cl.
*C02F 1/467* (2006.01)
*C25B 9/10* (2006.01)
(Continued)

(52) U.S. Cl.
CPC .......... *C02F 1/4672* (2013.01); *C02F 1/4606* (2013.01); *C02F 1/46104* (2013.01);
(Continued)

(58) Field of Classification Search
CPC ................ C02F 1/4672; C02F 1/46114; C02F 2001/46142; C02F 2001/46161; C25B 1/10; C25B 9/10
See application file for complete search history.

(56) References Cited

U.S. PATENT DOCUMENTS 5,770,033 A   6/1998  Murphy et al.
5,972,196 A   10/1999 Murphy et al.
(Continued)

FOREIGN PATENT DOCUMENTS

WO   99/01382 A1    1/1999
WO   03/093535 A2   11/2003
(Continued)

OTHER PUBLICATIONS

Andrade et al., "Degradation of phenol using Co- and Co,F-doped PbO2 anodes in electrochemical filter-press cells," *Journal of Hazardous Materials* 153:252-260, 2008.
(Continued)

*Primary Examiner* — Nicholas A Smith
(74) *Attorney, Agent, or Firm* — Seed IP Law Group LLP (57) ABSTRACT

An electrolytic cell, system, and method for the energy efficient electrochemical treatment of wastewater comprising organic and/or inorganic pollutants are disclosed. The system comprises an electrolytic cell comprising a solid polymer, proton exchange membrane electrolyte operating without catholyte or other supporting electrolyte. The electrolytic cell also comprises a filter layer incorporated between the anode fluid delivery layer and the anode flow field plate for removing various contaminants including particulates and/or suspended solids from the wastewater stream. The cell design and operating conditions chosen provide for significantly greater operating efficiency.

20 Claims, 3 Drawing Sheets

(51) Int. Cl.
| | |
|---|---|
| *C25B 1/10* | (2006.01) |
| *C02F 1/46* | (2006.01) |
| *C25B 11/04* | (2006.01) |
| *C25B 1/26* | (2006.01) |
| *C25B 9/08* | (2006.01) |
| *C02F 1/461* | (2006.01) |
| *C02F 1/00* | (2006.01) |
| *C02F 1/44* | (2006.01) |

(52) U.S. Cl.
CPC .......... *C02F 1/46114* (2013.01); *C25B 1/10* (2013.01); *C25B 1/26* (2013.01); *C25B 9/08* (2013.01); *C25B 11/0405* (2013.01); *C02F 1/001* (2013.01); *C02F 1/444* (2013.01); *C02F 2001/46133* (2013.01); *C02F 2001/46138* (2013.01); *C02F 2001/46142* (2013.01); *C02F 2001/46161* (2013.01); *C02F 2201/46195* (2013.01); *C02F 2303/04* (2013.01); *C02F 2303/16* (2013.01); *C02F 2305/08* (2013.01); *Y02E 60/366* (2013.01); *Y02P 20/20* (2015.11)

(56) References Cited

U.S. PATENT DOCUMENTS

| | | | | |
|---|---|---|---|---|
| 6,328,875 | B1 | 12/2001 | Zappi et al. | |
| 6,398,938 | B2 | 6/2002 | Merk et al. | |
| 6,533,919 | B1 | 3/2003 | Narayanan et al. | |
| 8,647,494 | B2* | 2/2014 | Highgate | C02F 1/46104 204/275.1 |
| 9,440,866 | B2* | 9/2016 | Legzdins | C02F 1/461 |
| 2013/0228500 | A1* | 9/2013 | Egner | B01D 61/425 210/192 |
| 2015/0298998 | A1* | 10/2015 | Legzdins | C02F 1/46104 205/748 |

FOREIGN PATENT DOCUMENTS

| | | |
|---|---|---|
| WO | 2005/095282 A1 | 10/2005 |
| WO | 2005/106078 A1 | 11/2005 |
| WO | 2009/045567 A2 | 4/2009 |
| WO | 2011/076396 A1 | 6/2011 |
| WO | 2012/167375 A1 | 12/2012 |

OTHER PUBLICATIONS

Butt et al., "Electrolytic Hydrogen Generation from Pharmaceutical Laden Wastewater," Water Environment Federation 2008, pp. 1224-1231.

Grimm et al., "Characterization of doped tin dioxide anodes prepared by a sol-gel technique and their application in an SPE-reactor," *Journal of Applied Electrochemistry* 30:293-302, 2000.

Heyl et al., "Electrochemical detoxification of waste water without additives using solid polymer electrolyte (SPE) technology," *Journal of Applied Electrochemistry* 36:1281-1290, 2006.

Jiang et al., "Simultaneous Hydrogen Production and Electrochemical Oxidation of Organics Using Boron-Doped Diamond Electrodes," *Environ. Sci. Technol.* 42:3059-3063, 2008.

Kargi, "Comparison of different electrodes in hydrogen gas production from electrohydrolysis of wastewater organics using photovoltaic cells (PVC)," *International Journal of Hydrogen Energy* 36:3450-3456, 2011.

Kiliç et al., "Hydrogen production by electrochemical decomposition of formic acid via solid polymer electrolyte," *Fuel Processing Technology* 90:158-163, 2009.

Mao et al., "A Modified Electrochemical Process for the Decomposition of Hydrogen Sulfide in an Aqueous Alkaline Solution," *J. Electrochem. Soc.* 138(5):1299-1303, May 1991.

Murphy et al., "Direct Electrochemical Oxidation of Organics for Wastewater Treatment," *Wat. Res.* 26(4):443-451, 1992.

Navarro-Solís et al., "$H_2$ production by PEM electrolysis, assisted by textile effluent treatment and a solar photovoltaic cell," *International Journal of Hydrogen Energy* 35:10833-10841, 2010.

Park et al., "Solar-Powered Production of Molecular Hydrogen from Water," *The Journal of Physical Chemistry Letters C* 112(4):885-889, 2008.

\* cited by examiner

METHOD FOR IMPARTING FILTERING CAPABILITY IN ELECTROLYTIC CELL FOR WASTEWATER TREATMENT

FIELD OF THE INVENTION

The present invention relates to electrolytic cells, systems, and methods for the electrochemical treatment of wastewater. In particular, it relates to the removal of organic pollutants and oxidation of inorganic compounds using solid polymer membrane electrolyte electrolytic cells.

BACKGROUND

There is substantial growth in the demand for new wastewater treatment technologies that is being driven by population growth and increasing volumes of wastewater produced, tighter wastewater quality regulations, increasing cost of clean water and water shortages, awareness for the protection of clean water sources and replacement of aging wastewater systems. Industries are specifically being forced both by tougher discharge standards and cost pressures to eliminate their recalcitrant wastewater pollutants prior to discharge, and to adopt on-site water reuse and recycling systems to avoid rising water supply and effluent discharge costs. The requirement is for cost-effective, sustainable water treatment technology that does not require the addition of chemicals and does not produce secondary pollution, is compliant with stringent water quality standards, and has minimal operational and maintenance requirements.

Industrial wastewater can contain organic compounds, many of which are toxic, persistent and resist conventional biological and chemical wastewater treatment. The best approach to treat recalcitrant wastewater is by non-chemical oxidation techniques that can mineralize the pollutants and reduce the organic load and toxicity of the waste, such as electrochemical oxidation. Electrochemical oxidation is sustainable, safe and has a high treatment efficacy eliminating a wide variety of pollutants such as persistent organic pollutants, dioxins, nitrogen species (e.g. ammonia), pharmaceuticals, pathogens, microorganisms, a majority of priority pollutants and pesticides. There are two main approaches to electro-oxidation of pollutants in wastewater. The first is to oxidize pollutants by indirect electrolysis, generating a redox reagent in situ as a chemical reactant. The mediator can be a metallic redox couple or a chemical reagent (e.g. chlorine, ozone, peroxides). These processes require the addition of a large amount of chemicals and/or feed oxygen, and produce secondary pollution leading to additional costs for the disposal of the treated wastewater and operation and maintenance of the process. The second approach is to use direct electrochemical oxidation, where the organic pollutants are oxidized on the anode surface.

A variety of cell configurations that include flow-through parallel plates, divided chambers, packed bed electrodes, stacked discs, concentric cylinders, moving bed electrodes and filter-press have been developed for direct electrochemical wastewater treatment. However, common to all these electrochemical cell configurations is poor operational efficiency leading to high energy consumption. The wastewater is utilized as electrolyte, and in the case of divided cells, both anolyte and catholyte. Due to very low ionic conductivity of wastewater though, the addition of a supporting electrolyte is required to improve the cell efficiency and obtain reasonable cell voltages. This generally results in salt, base and/or acid concentrations that exceed allowable pollutant discharge limits thereby adding to the cost for both the disposal of the treated wastewater and the balance of plant costs of liquid electrolyte handling. Large electrode gaps and low surface area electrodes are also contributors to efficiency losses and increased energy consumption. Slow mass transport in the pores of the porous beds, non-optimized catalyst materials with poor reaction kinetics, high electrode overpotentials, and catalysts with low over potentials for side reactions (e.g. oxygen evolution) also contribute to lower performance and efficiency losses. The use of cell component materials which passivate quickly and increase cell resistivity and instabilities, contribute to efficiency losses. Operating conditions also contribute to efficiency losses. With high mass and ionic transfer losses, at nominal operating current densities, the voltages are too low such that incomplete destruction of organic contaminants occurs and an organic film blocks catalyst sites reducing performance and requiring the use of cell reversal techniques to clean the electrode surfaces.

For instance, published PCT application WO9901382 discloses an electrolytic cell method and apparatus for the decontamination of fluids. The system advantageously comprises means for adding one or more chemical substances into the fluid to be treated (e.g. an acid, carbon dioxide, an alkali, hydrogen peroxide, or a salt.) In another example, Andrade et al., in J. Haz. Mats. 153, 252-260 (2008), disclose the use of a divided electrolytic cell to treat model phenol wastewater. A supporting electrolyte of sulfuric acid was required.

To eliminate the requirement for supporting electrolyte addition, various methods have been developed that reduce the electrode gap in single compartment electrochemical cell configurations. For example, U.S. Pat. No. 6,328,875 discloses the use of a porous anode allowing wastewater to penetrate through the anode to flow through the capillary inter-electrode gaps. However, the energy consumption was still high when run without a supporting electrolyte. As with all single chamber electrochemical systems, hydrogen is simultaneously produced and wastewater constituents are reduced on the cathode, which consume much energy. Fouling of the cathode commonly occurs from these reaction products, decreasing the cell efficiency and leading to increased energy consumption. Another problem encountered in single chamber systems during oxidation is the production of intermediate compounds. These compounds are reduced at the cathode and are then reoxidized at the anode decreasing cell efficiency and increasing energy consumption.

An approach to eliminate the requirement for addition of a supporting electrolyte addition is to use a solid polymer electrolyte (SPE) in the electrolytic cell. SPE technology has been developed for other purposes including the production of hydrogen by water electrolysis and of energy using polymer electrolyte membrane fuel cells. For instance, in the system disclosed in WO03093535, dehalogenation of halogenated organic compounds and destruction of nitrates is conducted on the cathode by electrochemical reduction. In this configuration, the anode and cathode compartments are divided by an ion exchange membrane, and an anolyte and halogen-containing catholyte are passed through their respective chambers. Although the system operated without supporting electrolytes, in order to operate at low current density (high cell efficiency), a supporting electrolyte was required in the anolyte and/or catholyte. Murphy et al. in Wat. Res. 26(4) 1992 443-451 used a SPE electrolytic cell to treat wastewaters with low or negligible supporting electrolyte content. The wastewater was re-circulated through both the anode and cathode. The energy consumption was very high however, and was attributed to low rates of phenol oxidation and side reactions, primarily oxygen evolution from water. J. H. Grimm et al. in J. Appl. Elect. 30, 293-302 (2000) used a SPE electrolytic cell to treat model phenol containing wastewater. The wastewater was pumped through the anode and cathode chambers in series. The energy consumption however was also high for phenol removal, which was attributed by the authors to the loss in current efficiency due to side reactions such as oxygen evolution. Further, A. Heyl et al., in J. Appl. Electrochem. (2006) 36:1281-1290, investigated a range of SPE electrolytic cell configurations at higher temperatures to de-chlorinate 2-chlorophenol model wastewater. In all cases, the wastewater was pumped across the membrane from either the cathode or anode to the opposite chamber through perforations in the membrane or by assisted electro-osmotic drag of treated membranes. The energy consumption was found to be impractically high for the untreated membrane, lower for the chemically treated membrane, and lowest for the perforated membrane. However, the best mineralization was obtained with anodic oxidation first followed by cathodic reduction with higher energy consumption. Still further, another approach for treating low conductivity wastewater without the use of supporting electrolytes was disclosed in WO2005095282. The system used a solid polymer electrolyte sandwiched between anode and cathode electrodes place in a single chamber of low conductivity wastewater. The energy consumption for pollutant mineralization of this setup was high due to the high voltages required.

Systems have also been developed in the art to reduce the cost of producing hydrogen by electrolysis by integrating electrolytic treatment of wastewater therewith. The electrolytic cells involved can use anolytes containing organic pollutants. For instance, Park et al., in J. Phys. Chem. C. 112(4) 885-889 (2008), used a single chamber cell to treat aqueous pollutants and produce hydrogen. As with all single chamber systems, a supporting electrolyte was required. The hydrogen generated was contained in a mixed product gas that required further treatment to recover usable hydrogen. Similar single chamber configurations were disclosed by T. Butt & H. Park in WEFTEC 2008 Conference Proceedings and by J. Jiang et al. in Environ. Sc. & Tech. 42(8), 3059 (2008). Divided cell configurations were disclosed for instance in WO2009045567 and by Navarro-Solis et al. in I J Hydrogen Energy 35 (2010) 10833-10841. The preceding systems all involved the use of additional supporting electrolytes. Systems without supporting electrolytes have also been disclosed for instance by F. Kargi in I. J. Hydrogen Energy 36 (2011) 3450-3456.

Systems using a solid polymer electrolyte based electrolytic cell have also been disclosed in the art to generate hydrogen and to treat wastewater. For instance, U.S. 65/333, 919 discloses a method for electrolysis of an aqueous solution of an organic fuel. In this system, permeation of unreacted methanol to the cathode (fuel crossover) takes place and causing high cathode overpotentials and requiring the addition of a hydrogen gas cleaning operation. Further, E. O. Kilic et al. in Fuel Proc. Tech. 90 (2009) 158-163 disclose a system to treat formic and oxalic acid and generate hydrogen. However, the specific energy consumption was high due to the higher current densities required.

Depending on the upstream municipal or industrial process, different particulates and suspended solids may be in the wastewater stream that can affect the performance of electrolytic cells. Suspended solids in wastewater may be organic or inorganic, depending upon the process from which they originate (Industrial Wastewater Management, Treatment, and Disposal, Manual of Practice No.FD-3 ($3^{rd}$ Ed. WEF, 2008). These solids are classified based on size and removal technique. Total suspended solids (TSS) are determined by filtering a sample through a defined filter medium, drying it in an oven, and then determining the residues' weight. For example, in the oil and gas industry, one would typically find particulates and suspended solids derived from oil, high molecular weight and insoluble organics and hydrocarbons, sulfides, hardness, formation solids, corrosion and scale products, and waxes in the wastewater stream. In another example, such as the textile manufacturing industry, one would typically find particulates and suspended solids derived from dye, organics, and non polar compounds in the wastewater stream. In yet another example, such as landfill leachates, one would typically find organics, hydrocarbons, oil, hardness, salts, metals, and non polar compounds. Prior art wastewater treatment systems typically employ a filtration means upstream of the electrolytic cell to filter out such particulates and suspended solids. However, such additional filter systems add a level of system complexity and cost to the overall wastewater treatment system.

Notwithstanding the substantial developments in the art, there remains a continuing need for more efficient and cost effective methods for wastewater treatment. The present invention addresses this need while additionally providing other benefits as disclosed herein.

SUMMARY OF THE INVENTION

Methods have been discovered for the energy efficient treatment of polluted wastewater using certain electrolytic cell designs and a combination of voltage and current density limitations. A lower current density results in better efficiency, and a lower voltage results in less unwanted side reaction (e.g. oxygen evolution). Improved energy efficiency can be achieved while essentially removing all the pollutant.

The electrolytic cell employed comprises a solid polymer electrolyte electrolytic cell comprising an anode, a liquid-electrolyte free cathode, and a solid polymer membrane electrolyte separating the anode and the cathode. The anode comprises an anode catalyst layer and an anode fluid delivery layer. The anode catalyst layer comprises an anode catalyst. The anode fluid delivery layer can comprise two or more component layers, for instance an anode substrate (e.g. a tin-coated metallic or titanium substrate) and at least one sublayer. In a like manner, the cathode comprises a cathode catalyst layer. The cathode can also comprise a cathode gas diffusion layer. The cathode catalyst layer comprises a cathode catalyst. The cathode in the electrolytic cell is liquid-electrolyte free. That is, the cathode comprises no liquid catholyte nor liquid supporting electrolyte. The electrolytic cell further comprises an anode flow field plate and a cathode flow field plate.

The energy efficient method then comprises supplying a flow of wastewater comprising a pollutant to the anode of the electrolytic cell, providing a voltage less than about 3 volts across the electrolytic cell wherein the anode is positive with respect to the cathode, and operating the electrolytic cell at an operating temperature and a current density less than about 20 mA/cm$^2$, and particularly less than about 10 mA/cm$^2$. This results in the pollutant being degraded and hydrogen gas being generated at the cathode. The generated hydrogen gas is exhausted from the cathode. The flow of wastewater can be supplied to the anode without an added supporting electrolyte, and the electrolytic cell can be operated over a wide range of wastewater temperatures.

In the present invention, to reduce or eliminate the need for external filters upstream or downstream of the electrolytic cell, a filter layer is incorporated between the anode fluid delivery layer and the anode flow field plate to remove particulates and suspended solids from the wastewater stream. In the assembly of the electrolytic cell, the filter layer may be incorporated onto the surface of the anode fluid delivery layer, or onto the surface of the anode flow field plate, or alternatively provided as a discrete component. The filter layer is porous to block or trap or adsorb the particulates and suspended solids in the wastewater stream.

The average pore size of the filter layer can desirably be less than that of the adjacent anode fluid delivery layer. Since the average pore size of the anode fluid delivery layer may vary throughout its thickness, the reference here is to the average pore size on the flow field side of the anode fluid delivery layer. And so more specifically, the average pore size of the filter layer can desirably be less than the flow field side average pore size of the anode fluid delivery layer.

In one embodiment, the filter layer can comprise two or more plies and the average pore size of the ply facing the anode flow field plate is smaller than the average pore size of the next adjacent ply. In other embodiments however, the filter layer can have an essentially unimodal pore size distribution.

In another embodiment, the filter layer can comprise a polymer sheet membrane filter. The filter layer can further comprise a sublayer of electrically conductive particles, for instance to render it electrically conductive.

On the other hand, the filter layer may instead be electrically non-conductive. This is possible when current collection from the anode side of the cell can solely be obtained through the anode fluid delivery layer. In such embodiments, the anode flow field plate can also be electrically non-conductive. The filter layer in such embodiments can comprise a polymer.

Other features can be incorporated into the filter layer. For instance, the filter layer can comprise adsorption media and/or high surface area oxidation catalyst.

The method can additionally comprise a cleaning step for the filter layer involving removing contaminants from the filter layer using one or more removal methods in combination selected from the group consisting of in-situ backwashing, oxygen (air or gas) scouring, chemical cleaning, ultrasonic cleaning, gas purging (with or without particles), liquid purging (with or without particles), potentiostatic cleaning, flowing water, and oxidation of adsorbed contaminants by generating chlorine and intermediates of oxygen at higher anodic voltages.

The filter layer may also have catalytic capability for generating free chlorine from chloride-containing wastewaters. The free chlorine may be used for disinfecting and/or oxidizing purposes for organic contaminants in the wastewater stream. Chlorine gas may also be generated to in-situ clean the filter layer. And the method can additionally comprise a post treatment step for removing excess free chlorine selected from the group consisting of: reducing electrochemically, adsorbing, decomposing by contacting a transition metal, reacting with a salt, reacting with a chemical reducing agent, reacting with organic matter, decomposing by contacting a redox filter, decomposing by light exposure, and decomposing by heating.

The associated system for the treatment of wastewater thus comprises a solid polymer electrolyte electrolytic cell in which both the system and the electrolytic cell are configured to operate according to the method. For instance, the system is configured to provide a flow of wastewater to the anode and operate at appropriate voltage and current densities but it does not require means for adding a supporting electrolyte to the flow of wastewater. The system can comprise greater than one electrolytic cell in a stack, series or parallel arrangement. Further, the system can comprise monopolar or bipolar configurations, including bipolar pairs within a monopolar stack.

DETAILED DESCRIPTION

Certain terminology is used in the present description and is intended to be interpreted according to the definitions provided below. In addition, terms such as "a" and "comprises" are to be taken as open-ended. Further, all US patent publications and other references cited herein are intended to be incorporated by reference in their entirety.

Herein, SPE stands for solid polymer electrolyte and can be any suitable ion conducting ionomer, such as Nafion®. A SPE electrolytic cell is thus a cell comprising a SPE as the electrolyte to which electrical energy is supplied to effect a desired electrochemical reaction (with a positive voltage being applied to the anode of the cell).

Herein, unless otherwise specified, when referring to a numerical value the term "about" is intended to be construed as including a range of values within plus or minus 10% of the value being referred to.

An electrode in the cell is "liquid-electrolyte free" means that no significant ion containing liquid is deliberately provided to the electrode, such as is done in certain systems in the prior art. However, it is not intended at the cathode for instance to exclude minor amounts of wastewater which may cross over through a solid polymer electrolyte.

Figure 1:
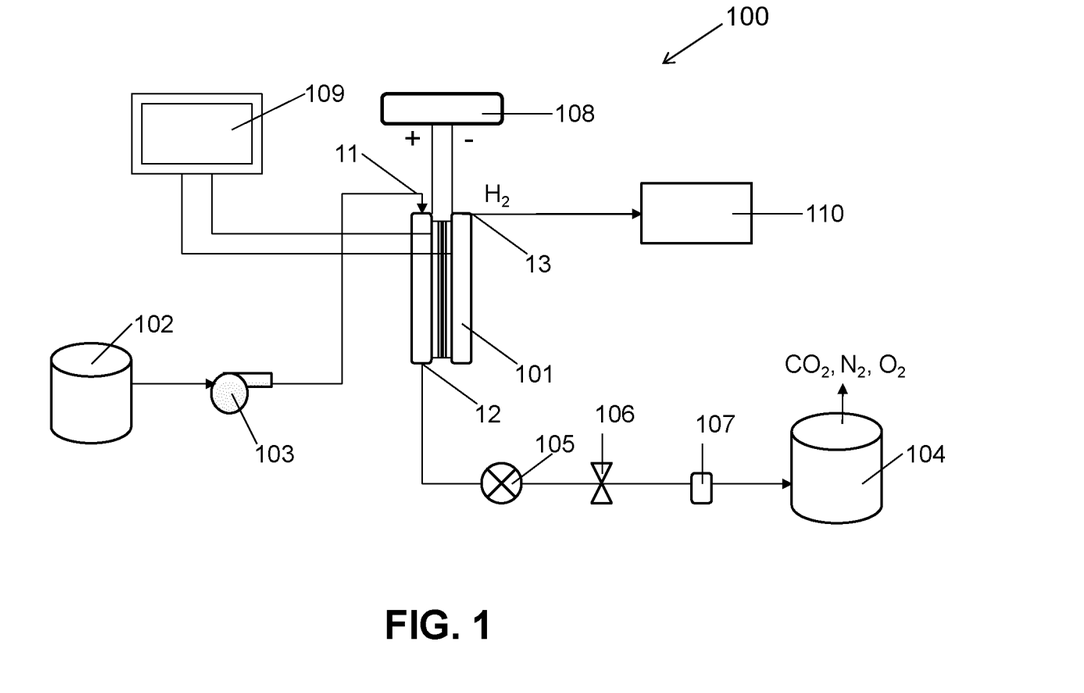
FIG. 1 shows a schematic of an embodiment of an energy efficient system for the treatment of polluted wastewater.

An exemplary energy efficient system for the treatment of wastewater is shown in the schematic of FIG. 1. System 100 comprises SPE electrolytic cell 101 for the direct electrochemical treatment of organic contaminated wastewater. A controlled flow of wastewater 102 is supplied to anode inlet 11 of cell 101 by some suitable delivery means, e.g. peristaltic pump 103. After sufficient treatment/transit time in cell 101, the treated wastewater exits at anode outlet 12 and as shown here is delivered to treated effluent tank 104 where entrained or by-product gases generated during treatment (e.g. carbon dioxide, nitrogen, oxygen) are allowed to vent to atmosphere. For monitoring and flow control purposes, pressure gauge 105, valve 106, and flowmeter 107 are provided in the anode outlet line.

Electrical energy is provided to cell 101 by DC power supply 108 and the temperature of cell 101 is monitored and controlled by temperature controller 109. Hydrogen is generated at the cathode of cell 101 as a result of the electrochemical treatment and is exhausted at cathode outlet 13. As shown in FIG. 1, the relatively pure hydrogen may be collected and stored in storage container 110 for later use in the generation of electricity or as a fuel or chemical reactant.

Figure 2:
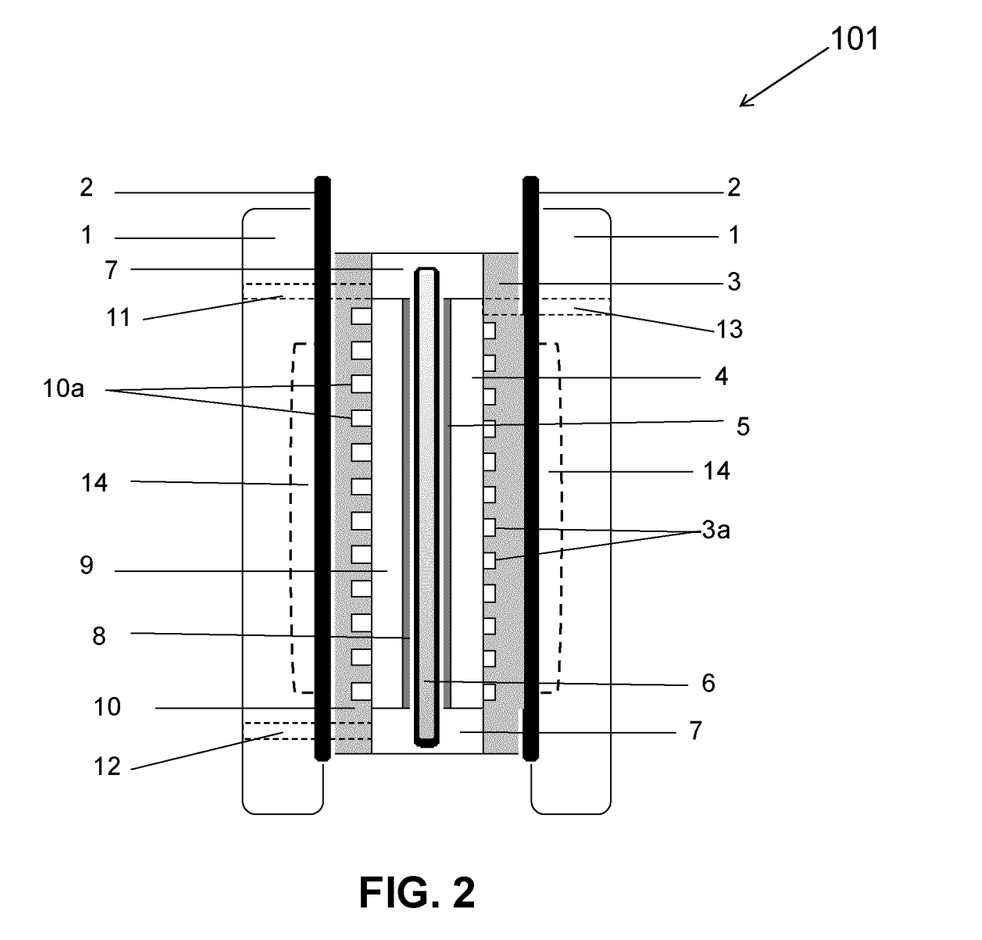
FIG. 2 shows a schematic of a solid polymer electrolyte electrolytic cell used in the system of FIG. 1.

FIG. 2 shows a detailed schematic of solid polymer electrolyte cell 101. Cell 101 comprises SPE membrane electrolyte 6. The cell anode comprises anode catalyst layer 8 and anode fluid delivery layer 9. The cell cathode comprises cathode catalyst layer 5 and cathode gas diffusion layer 4. Anode flow field plate 10 is provided adjacent anode fluid delivery layer 9. Anode flow field plate 10 comprises flow field channel/s 10a which are fluidly connected to anode inlet 11 and anode outlet 12. Wastewater 101 is delivered uniformly to and from anode fluid delivery layer 9 by directing it through flow field channel/s 10a. Cathode flow field plate 3 is provided adjacent cathode gas diffusion layer 4. Cathode flow field plate 3 comprises flow field channel/s 3a which are fluidly connected to cathode outlet 13. Since no catholyte nor other liquid nor fluid is supplied to the cathode, a cathode inlet is not required. Hydrogen gas generated during the electrochemical treatment of wastewater 101 however is collected from the cathode and directed out of the cell by way of flow field channel/s 3a. Leads 2 are provided at the cell electrodes in order to make electrical connections to power supply 108. Mechanical support is provided to the components in cell 101 by way of end plates 1 which clamp the cell together. Sealing is provided to the cell by seals 7. Finally, FIG. 2 shows heating elements 14 which may be used to control the cell temperature during operation.

Anode fluid delivery layer 9 is provided to readily deliver fluids to and from anode catalyst layer 8 in a uniform manner. In addition, it provides electrical contact and mechanical support thereto. Carbon fibre paper, foams, and other materials commonly employed in SPE fuel cell embodiments may be contemplated here as substrates in anode fluid delivery layer 9. And materials for electrical conduction and wettability may be added thereto. The pore size distribution and bulk porosity of anode fluid delivery layer 9 is carefully controlled as it can be important with regards to carbon dioxide bubbles formed (effecting size and mixing) and their effect on mass transport.

If elevated anode potentials are involved, dissolution of materials such as carbon fiber paper may occur. In such cases, more stable media can be employed including metal coated (e.g. nickel coated) carbon fiber paper or woven cloth, metal screen/gauze/cloth (particularly with 2 or more ply screens with different mesh sizes and the smaller closest to membrane, with weave patterns to promote in-plane water permeability, flattened and diffusion bonded or spot welded together), sintered metal screen/gauze/cloth (again with 2 or more ply screens to improve current distribution and flattened), expanded metal foil/film/membrane (with 1 or more plies and flattened), sintered metal fiber and powder media (again with 1 or more plies and flattened, having asymmetric pore size and with the smaller pore diameter located closest to membrane, and having high in-plane water permeability), flattened photo-etched media, chemically etched media, micro-perforated plate, sintered metals, or combinations thereof. The preceding materials are electrically conductive and can be corrosion resistant types (stainless steel, inconel, monel, titanium, alloys, valve metals) or have corrosion resistant coatings applied thereto (e.g. carbides, nitrides, borides, noble & valve metals & metal alloys, metal oxides.

In more specific examples, the anode substrate may be any of the following materials:

1. 2 ply sintered metal mesh. The first mesh layer has a larger pore size to filter large particles and the next layer has a smaller pore size. The mesh size of each ply is specified before bonding. For example, MIC10TL2 from TWP Inc. (USA) is a 2 ply T316L stainless steel with the small mesh ply rated at 10 micron. This substrate is then nickel or palladium plated, titanium nitride or niobium coated to provide a corrosion resistant and electrically conductive coating.
2. Sintered metal fiber filtration media. For example, Bekipore ST20AL3 from Bekaert (USA) which is a multilayer non woven metal fiber porous media with a filter rating of 20 microns. The metal is 316 stainless steel. This substrate is then nickel or palladium plated, titanium nitride or niobium coated.
3. Sintered metal powder filtration media. For example, Mott 316L stainless steel series 1100 porous filter plate material (Mott Corporation, USA). This substrate is electroplated with nickel for corrosion resistance and electrical conductivity.
4. Expanded titanium foil in one or more plies with different hole sizes. For example, MicroGrid® Precision-Expanded Foils from Dexmet, or photo etched stainless steel or titanium mesh screens MicroEtch® Screens from Tech-Etch.

Alternatively, the media may comprise sintered ceramic and porous plastic materials having conductive coatings to impart electrical conductivity. Conductive coatings may be applied to the surfaces contacting the catalyst-coated membrane if the corrosion resistant materials employed form a passive layer. For monopolar designs, high in-plane conductivity is desirable, suggesting use of corrosion resistant, conductive, materials and coatings therefor. Further still, porous plastic materials may be contemplated that are electrically conductive, e.g. PVDF, PEEK, phenolic polymers filled with carbon, high surface area graphite, silver etc. Such materials can be formed into sheets and expanded or needle punched to provide holes with the desired pore size.

The anode fluid delivery layer with filter layer may be made via a number of different methods. For example, the constituents of the filter layer, such as conductive particles and/or nano-particles, may be suspended in a solution and then applied onto the anode substrate, optionally with hydrophobic, hydrophilic, and/or ion conducting components, and optionally with compression and curing processes after application of the filter layer. Additionally, or alternatively, the filter layer media may be applied to a surface of anode flow field plate.

For instance, a sintered metal fiber filtration media substrate as described in the foregoing may be coated with a sublayer comprising spherical or other shaped particles of nickel, titanium (& Ti alloys), titanium carbide, titanium nitride, niobium, palladium (& Pd—Co alloy), carbon (graphite), and/or tin oxide (ATO, ITO) powder that is either sinter bonded to the substrate or powder mixed with a polytetrafluoroethylene (PTFE) dispersion, then coated onto the substrate, and then sintered to bond the PTFE. The use of uniform spheres may result in a more uniform filtering pore size and improved fluid distribution within the anode fluid delivery layer itself. For example, Bekipore (R) ST titanium sintered metal fiber filtration substrate with a sublayer of antimony doped tin oxide powder and either PTFE or ionomer may be used.

When contemplating plastic filtration media as an anode substrate, such media can be coated with a sublayer comprising spherical corrosion resistant polymers PTFE, PVDF, or a mixture of polymers and spherical nickel, titanium (& Ti alloys), titanium carbide, titanium nitride, niobium, palladium (& Pd—Co alloy), carbon(graphite), and/or tin oxide (ATO,ITO) powder that is either sinter bonded to the substrate or powder mixed with a polytetrafluoroethylene (PTFE) dispersion, then coated onto the substrate, and then sintered to bond the PTFE.

In another example, the anode substrate may be a tin plated, low cost metal substrate porous media, such as sintered metal fibers, screens, and meshes. Exemplary metals may include steel due to its cost, stainless steel due to its superior corrosion resistance, and copper due to its electrical conductivity. Tin oxide typically forms on the surface of the metal substrate after plating, which provides a relatively chemically robust and tenacious barrier, thereby providing added corrosion resistance. A heat treating process may be performed to form a uniform tin oxide surface coating. The tin oxide may be particularly useful in conductive wastewaters because it is catalytic at the operating voltages (i.e. less than 3 volts). Without being bound by theory, the tin oxide layer on the porous metal substrate provides a larger catalytic surface to oxidize hydroxyl radicals and/or generate free chlorine if chlorides are present in the wastewater. In some embodiments, the substrate may comprise ionomer. This may be useful for wastewaters that are not conductive as the ionomer and provides a proton path to the membrane. The ionomer may be incorporated into the substrate by, for example, spraying or soaking the tin-oxide coated substrate in an ionomer dispersion followed by drying, and then annealed/heat treated at about 140 to 160 degrees Celsius for greater than about 1 hour in a nitrogen atmosphere.

In one method, tin is applied using a continuous electrolytic process, in high volume (e.g. reel-to-reel process). By selecting a proper coating thickness, appropriate corrosion resistance is obtained. Duplex plating with a Nickel underplating (1.3 um thickness) barrier layer can also be used for improved corrosion resistance and preventing formation of Sn intermetallics with substrate metal.

Another method of coating tin on the substrate is reflow tin plating, wherein an electrolytic plating process is followed by tin reflow in convection oven. This method provides a relatively pure, dense, and porosity-free structure while also providing uniform tin distribution over the porous surface of the substrate. In yet another method, the substrate is drawn through a molten tin tank to deposit a thin layer of tin coating. Both reflowed tin and hot dip are tin whisker mitigation finishes.

In one example, the substrate is a stainless steel porous media. The stainless steel substrate is degreased, electropolished, cleaned with nitric acid, nickel strike to about 5 microns thick (underplate for adhesion), and then tin plated to about 7 microns thick. To obtain the tin oxide layer, tin plated substrate may be heat treated or thermally aged at greater than about 150 degrees Celsius for greater than about 12 hrs. Alternatively, the tin oxide layer can be formed electrochemically in a solution of sulfuric acid at a pH of about 2 and at a voltage of greater than about 0.229 SCE (or about 0.5V SHE).

With regards to the anode catalyst, platinum, tin oxide, antimony tin oxide, manganese oxide and mixtures thereof have been used successfully. In the case of antimony tin oxide, heat treatment to improve its electrical conductivity or doping, for instance with Nb, may be considered to improve durability. Manganese oxide can be considered for purposes of decomposing any hydrogen peroxide which may be formed at the anode. Other n- and p-type semiconductor oxides, perovskite-like oxide classes, and amorphous or nanocrystalline transition metal oxides (e.g. $MoO_2$) may also be considered as anode catalysts. Further, spinels of cobalt and nickel, and high surface area nickel oxides may also be considered. As is known in the art, use of supported catalysts (e.g. Pt dispersed on carbon or antimony tin oxide on high surface area graphite or Nb particles) can improve the dispersion of the catalytic materials and thus utilization and also the interaction between certain catalysts and supports can enhance catalytic activity and durability. Generally dopants can be employed to improve electrical conductivity (e.g. antimony doped $SnO_2$, chlorine and fluorine doped $SnO_2$) or to improve durability and stability at elevated voltages (e.g. cobalt, nickel, palladium, niobium, tantalum, platinum, palladium, iridium, ruthenium, vanadium, rhenium), and mixtures of such dopants to improve both electrical conductivity and stability/durability (e.g. $SnO_2$ doped with Nb and a dopant selected from the group Sb, Fe, F, Pt and Ni). Other possible dopants include Mo, Cr, Bi, and W.

The selected catalyst materials are catalytic at lower voltages for the organic contaminants (i.e. have a lower overpotential) so the applied voltage required is lower and consequently, the current density is lower. Such catalyst materials have a high overpotential for water electrolysis, so that the generation of oxygen can be controlled at the operating voltage thereby reducing the current density associated with this reaction.

Other considerations in the selection of anode catalyst include use of nanoparticles, nanostructured and/or mesoporous materials to obtain high surface areas. Supported catalysts may be employed using supports of graphite. If stability of graphite at elevated anodic voltages is an issue, stable, conductive particles including carbides, nitrides, borides, corrosion resistant metals, alloys, and metal oxides (e.g. Nb, $Nb_2O_5$, ZnO, NbC and/or mixtures thereof) can be employed. Additives can include perovskite-based metal oxides that exhibit mixed electronic and ionic conductivity.

Anode catalyst layer 8 generally comprises particles to improve electron conduction, ionomer (e.g. similar to that used in the membrane electrolyte) for ion conduction and to serve as a binder and material to control the wetting characteristics (e.g. dispersed PTFE). Pore size and overall porosity can be engineered to some extent by choice of particle size and agglomerate size (which can be modified for instance by controlling the high shear mixing rate during preparation of a catalyst ink or slurry used to make the catalyst layer). The pore characteristics of the anode catalyst layer, the surface chemistry and surface area can be important with regards to the mass transport of wastewater to the catalyst and the removal of product gas such as carbon dioxide. Preferably, the pore structure and hydrophobic surfaces of the anode catalyst layer facilitate bubble detachment so that gas blanketing and/or pore blockage does not occur. A graded particle size and pore size distribution can be employed in catalyst layer 8 to allow deeper penetration of wastewater and greater catalyst surface area utilization.

The cathode catalyst can be selected from the group of conventional catalysts commonly used for hydrogen evolution, including platinum or supported platinum (e.g. carbon supported platinum), palladium, palladium alloys, supported Pd/C, nickel & oxides thereof, rhodium (e.g. metals where significant coverage by $H_2$ species is possible), molybdenum disulfide, perovskite-based metal oxides that exhibit mixed electronic and ionic conductivity, amorphous or nanocrystalline transition metal oxides, and high surface area Raney metals and metal blacks. In addition, manganese oxide, graphite, and carbon may also be employed at the cathode. Again, manganese oxide may be beneficial to decompose any hydrogen peroxide present. Along with cathode catalyst, cathode catalyst layer 5 also generally can comprise particles to improve electron conduction, ionomer for ion conduction and to serve as a binder, and material to control the wetting characteristics. Cathode catalyst layer 5 can be prepared by coating onto cathode gas diffusion layer and sintering at an appropriate temperature (e.g. about 150° C. or 370° C. respectively depending on whether ionomer or PTFE is employed). Conductive particles in layer 5 can desirably be mixed to provide a size distribution that optimizes current distribution and porosity for hydrogen recovery. If erosion is an issue, PTFE and/or other stable binders in catalyst layer 5 can be employed for improved erosion/ wear resistance.

Cathode gas diffusion layer 4 is provided to readily deliver gases to and from cathode catalyst layer 5 in a uniform manner Layer 4 is desirably designed to repel wastewater which may cross-over from the anode side through the membrane electrolyte, while still permitting ready removal of generated hydrogen gas. Thus, a hydrophobic construction may be employed, for instance a teflonated stainless steel mesh substrate. Further, use of a hydrophobic sublayer with a small pore structure adjacent cathode catalyst layer 5 may also serve to prevent wastewater cross-over from entering the rest of the cathode. In turn, this can reduce or eliminate parasitic reactions and contamination at the cathode and thereby help keep the current density low. In general, materials similar to those employed in anode fluid delivery layer 9 may be considered. For monopolar designs, high in-plane conductivity is desirable, suggesting use of corrosion resistant and hydrogen resistant, conductive, materials and coatings therefor (e.g. nickel, palladium alloys, titanium nitride, etc.).

The flow field channels 3a, 10a in the cathode and anode flow field plates 3, 10 can have numerous configurations, including single serpentine, interdigitated, and/or multiple linear designs, and the cross-sections can have various shapes. Designs for gravity assist may be employed. Accommodating the hydrogen generated at the cathode is relatively straightforward and one end of the cathode flow field may be dead-ended. At the anode, channel design preferably maximizes residence and encourages uniform mixing of the liquids and generated gases. It can be useful to provide for turbulence to promote the mixing of gas and liquid and to prevent bubble coalescence and large plugs of gas from forming. This may be accomplished by providing static means for in-line mixing in the channels, e.g. spiral tape, twisted tape, or helical static mixing elements in various locations within flow field channels 10a. Such mixing can serve various purposes including reducing a concentration overvoltage at anode, eliminating radial gradients in temperature, velocity and material composition, and improving mass transport of the wastewater allowing larger channels and higher wastewater flows to be used without any loss to performance. Appropriate mixing components would continuously mix the wastewater and direct the wastewater flow to the outer perimeter so that pollutants are efficiently delivered to the catalyst layer and gas bubbles are contacted with the porous plate surfaces for removal. It is useful to provide for removal of the product gas without disrupting liquid flow in the channels.

Unexpectedly high energy efficiency can be obtained from system 100 and can result from appropriate limitations to the voltage and current density applied to the cell and by adoption of some of the designs and components used in advanced SPE fuel cells for the generation of electricity. In particular, the voltage applied across electrolytic cell 101 (or across individual cells if more than one is employed in a system) should be less than about 3 volts. The current density is limited to below about 20 mA per cm$^2$ of electrode area.

The reasons for the improved efficiency of the instant energy efficient system are not completely understood. However, without being bound by theory, several mechanisms may be involved at the anode for the mineralization of organic pollutants. Oxygen for the "electrochemical incineration" of organic pollutants in the wastewater is obtained from water from an oxygen evolution reaction. Adsorbed hydroxyl radical and oxygen radical species generated on the surface of the anodic catalyst can mineralize organic pollutants present. In addition, for certain n-type semiconductor oxide catalyst, anionic (oxygen) vacancies can preferentially react with water and generate OH* radicals. Oxidation via intermediates of oxygen evolution/hydroxyl radicals at anodic potentials in the region of water discharge can mineralize or partially oxidize organic pollutants. Direct oxidation of ammonia to nitrogen may occur. Further, indirect electrochemical oxidation may take place by inorganic oxidants generated by anodic oxidation of sulfate, carbonate, or phosphate ions in the wastewater. And further still, there may be indirect electrochemical oxidation by redox reagents electrochemically generated from a mediator present in the wastewater.

As mentioned in the foregoing, particulate and suspended solids contaminants in the wastewater stream are preferably removed either before or after electrochemical removal of organic contaminants. In the present wastewater treatment apparatus, removal of particulates and suspended solids prior to electrochemical wastewater treatment reduces or prevents blockage of the catalyst sites. To accomplish this, the electrolytic cell comprises at least one porous filter layer between the anode flow field plate and the anode fluid delivery layer. However, other structures may also be included to assist in filtration. By engineering the average pore size of the filter layer appropriately, and particularly to be smaller than that of the adjacent fluid delivery layer, particulate and suspended solids contaminants are prevented from entering the anode fluid delivery layer while still allowing filtered wastewater to access the anode catalyst layer for treatment.

Figure 3:
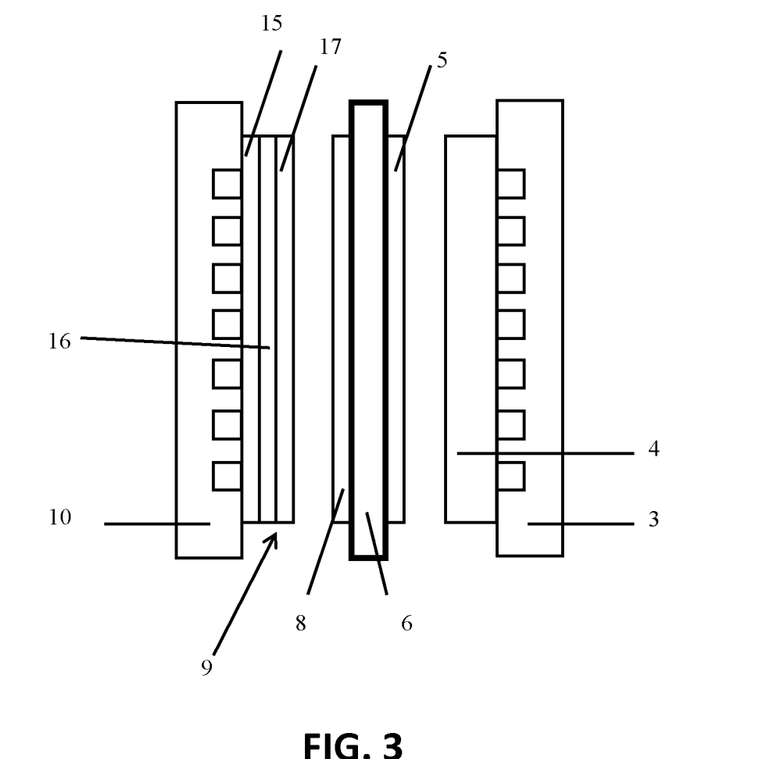
FIG. 3 shows an exploded schematic of an inventive embodiment of a solid polymer electrolyte electrolytic cell for use in the system of FIG. 1, in which a filter layer is incorporated between the anode flow field plate and the anode fluid delivery layer.

FIG. 3 shows an exploded partial schematic of an embodiment of the solid polymer electrolyte electrolytic cells of the invention. (In FIG. 3, the same numerals have been used for like elements to those used in FIG. 2.) Electrolytic cell 102 additionally comprises filter layer 15 which is incorporated between anode flow field plate 10 and anode fluid delivery layer 9. During assembly, filter layer 15 may be applied to anode fluid delivery layer 9, or applied to anode flow field plate 10, or applied as a discrete component to be clamped in place by end plates (not shown in FIG. 3). And further, in FIG. 3, anode fluid delivery layer 9 is made of two component layers, namely anode substrate 16 and applied sublayer 17.

Filter layer 15 is provided to prevent particulate and suspended solids contaminants from entering anode fluid delivery layer 9. The average pore size of filter layer 15 is chosen to remove the particles expected to be found in the wastewater. For example, to filter particles of 50 micrometer size or greater, the average pore size would be less than 50 um. Further, the average pore size of filter layer 15 is preferably smaller than the average pore size of the adjacent anode fluid delivery layer 9. In situations where the pore size throughout anode fluid delivery layer 9 is not uniform, the average pore size of filter layer 15 is preferably less than that of the flow field side of anode fluid delivery layer 9. This configuration provides for removal of contaminants while still allowing filtered wastewater to access the anode catalyst layer for treatment. Cake formation on the surface of filter layer 15 is promoted and this prevents clogging of both filter layer 15 and anode fluid delivery layer 9. Also oxidation products can readily be removed from the catalyst layer.

Examples of suitable materials for filter layer 15 include: diffusion bonded porous metals such as nonwoven fleece or fibers or felt, sintered porous metal media (e.g. Bekiflow® HC or MKI's Dynapore® diffusion-bonded filter plate laminate), particles, and wire mesh or multilayer mesh laminates (which can all be pleated to maximize surface area). Properties such as porosity, pore size distribution and uniformity of material thickness of such materials can be accurately controlled.

In some embodiments, filter layer 15 may include at least one membrane-type filter (e.g. polymer sheet membrane filter such as Durapore™ SV 5 micron PVDF, Omnipore™ LCR 5, 10 micron hydrophilic PTFE, or Sterlitech™ Silver Metal Filter Membranes. Such membranes have high flow rates and throughput, low extractables and broad chemical compatibility.) Membrane-type filters typically comprise a unimodal pore distribution for capturing particles of a size larger than the pore size of the membrane-type filter, while particles smaller than the pore size of the membrane-type filter pass through the membrane-type filter in a cross-flow and/or perpendicular flow configuration. In such embodiments, filter layer 15 may comprise a membrane-type filter in combination with a sublayer or sublayers of conductive particles and/or nanoparticles for added filtering capability (not shown).

In certain embodiments, it is possible to arrange for current collection to be performed solely via anode fluid delivery layer 9. In such cases, anode flow field plate 10 need not be electrically conductive and can be made of a non-conductive but corrosion resistant polymer (e.g. PVDF) or ceramic. In a like manner, filter layer 15 also need not be electrically conductive and can also be made of a non-conductive but corrosion resistant polymer or ceramic. Poly Grid® precision-expanded PVDF from Dexmet and/or other fluoroplastics, polyamides, polyolefins, polyesters, polysulfones, and polyvinyls may be suitable. Further still, filter layers made of polymer sheet membrane filters can have 2 or more plies and desirably with plies of different average pore size. In particular, the plies can be arranged to have a smaller average pore size nearest the anode flow field plate 10 and a larger pore size adjacent anode fluid delivery layer 9. In the case of a 3 ply filter layer 15, the average pore size may vary from small to large to smallest in which the smallest on the $3^{rd}$ ply adjacent anode delivery layer 9 prevent any particles (e.g. metal oxides) formed in filter layer 15 from reaching anode catalyst layer 8.

In some embodiments, filter layer 15 may include adsorption capability to remove insoluble hydrocarbons and organic compounds, dissolved metals, anions (e.g. fluoride) as well as bacteria, pathogens, and micropollutants that may be in particular wastewater streams. Without being bound by theory, filter layer 15 binds the contaminant species from the wastewater stream onto its surface by virtue of the surface energy that is operative at the filter mean's surface, thereby adsorbing the insoluble hydrocarbon and/or organic compounds in the wastewater stream with no chemical changes exerted on the adsorbed species as the wastewater stream moves therethrough. The adsorption media in filter layer 15 may be incorporated as single or multiple sublayers, as described in the foregoing. Suitable adsorption media for filter layer 15 include activated carbon made from different precursors such as walnut shells; high surface area carbon/graphite media, such as carbon nanotubes, nanoparticles, whiskers, fibers, felt, foam, graphene, and synthetic nanoporous/mesoporous carbons, such as those supplied by Novacarb (Basingstoke, UK), ceramics such as activated alumina, zeolites, or combination of these. If electrically conductive media is employed for filter layer 15, such as activated carbon and high surface area carbon/graphite media, bacteria and pathogens, micropollutants, organic molecules and other inorganics such as hydrogen sulfide can be removed by adsorption of the compounds to the surface of the pores of filter layer 15, and then the electrode voltage applied to the electrolytic cell is used to disinfect and oxidize these surface contaminants by direct electrolysis.

Specifically filter layer 15 may filter metal ions and cations by adsorption/contact onto the filter and the electrode voltage applied oxidizes metals for removal from effluent. The metal ions and cations react with the filter materials before they can reach the anode catalyst layer. Small pore size sublayer 17 may prevent the oxide particles from contacting the catalyst surfaces in anode catalyst layer 8. And, filter layer 15 may filter anions by electro adsorption onto a conductive filter by electro adsorption to keep catalyst surfaces free for organic oxidation only and improved efficiency. For example, sulfate, carbonate, phosphate anions are oxidized by hydroxyl radicals at the catalyst surface so filtering them first gives a higher surface area/hydroxyl radicals available for organic oxidation. The surface can be regenerated by turning off the voltage to desorb anions. This can be performed at set intervals, with the frequency depending on the concentration of anions in wastewater. To improve the efficacy of this filter layer, catalysts may be included to oxidize the anions so that regeneration is not required. Alternatively, the electrode voltage may be increased somewhat in the absence of catalysts in order to oxidize anions. This may be beneficial in that the oxidized anions (e.g. sulfate is oxidized to peroxodisulphate) are also strong oxidants and will oxidize some organics improving efficacy. Further still, filter layer 15 may also filter anions and cations by ion exchange with ion exchange resin incorporated in filter.

To further improve efficacy of the filter layer, filter layer 15 may include high surface area oxidation catalysts, such as precious metals, metal oxides, and boron doped diamond, which are catalytic at lower voltages. For example, in embodiments for wastewater streams containing relatively high concentrations of chloride ions, the chloride ions can be catalytically oxidized to generate free chlorine for disinfection of microorganisms and/or oxidation of ammonia, organic and other contaminants in the wastewater stream.

The chemical reactions involving chloride ions at the anode depend on the pH level. At pH values lower than 3.3, the primary active chloro species is $Cl_2$ gas. At higher pH values, the predominant species are HClO at pH less than about 7.5 and $ClO^-$ at pH greater than about 7.5. At higher pH values, one may observe enhanced electro-oxidation of pollutants by HClO and $ClO^-$ acting as reagents in the total volume/bulk solution of wastewater. The chemical reactions involved at the anode may include the following:

For oxidation of dye contaminants:

$$Dye + ClO^- \rightarrow CO_2 + H_2O + Cl^- \quad (1)$$

For oxidation of hydrogen sulfide:

$$HS^- + ClO^- \rightarrow S + OH^- + Cl^- \quad (2)$$

For oxidation of ammonia:

$$HOCl + 2/3 NH_3 \rightarrow 1/3 N_2 + H_2O + H^+ + Cl^- \quad (3)$$

Chlorohydroxyl radicals may also be generated, particularly on boron doped diamond surfaces and precious metal oxides such as $RuO_2$, $IrO_2$ and their mixtures. For oxidation of organic pollutants by chlorohydroxyl radicals, the chemical reactions involved at the anode may include the following:

$$\text{Organic substance} + [*ClOH] \rightarrow CO_2 + H^+ + Cl^- \quad (4)$$

Other examples would be the oxidation of sulfate in sulfate containing wastewaters to peroxodisulfate, and the oxidation of carbonate to percarbonate in high alkalinity wastewaters (on precious metal, metal oxides, and particularly boron doped diamond surfaces) for purposes of disinfection of microorganisms and/or oxidation of ammonia, organic and other contaminants in the wastewater stream. Peroxodisulfates and percarbonates reagents are known to be very powerful oxidants and can oxidize organic matter.

$$2SO_4^{2-} \rightarrow S_2O_8^{2-} + 2e^-$$

$$2CO_3^{2-} \rightarrow C_2O_6^{2-} + 2e^-$$

If the treated wastewater from the SPE electrolytic cell should preferably have a low concentration of free chlorine due to environmental concerns, a post treatment step may be employed to remove excess free chlorine, including: electrochemical reduction, adsorption by granular activated carbon or kaolinite clay, decomposition by contacting transition metals (especially copper, iron, nickel and cobalt and/or their oxides and spinels such as substituted cobalt oxide spinels), reacting with salts such as ammonium acetate, ammonium carbonate, ammonium nitrate, ammonium oxalate, and ammonium phosphate, reacting with chemical reducing agents such as sodium metabisulfite, reacting with organic matter such as glycerol, decomposition by contacting redox filters such as copper/zinc alloys, decomposition by light exposure (especially UV), and decomposition by heating the solution.

Although filter layer 15 performs substantial filtration functions (as discussed above), additional filtration functions can also be performed within anode fluid delivery layer 9, for example by appropriate engineering of substrate 16 and sublayer 17 in FIG. 3.

Anode fluid delivery layer 9 may comprise a sublayer (e.g. sublayer 17) or multiple sublayers of conductive particles and/or nano-particles that modify the pore structure and pore sizes of anode fluid delivery layer 9. By imparting different pore structures and pore sizes in anode fluid delivery layer 9, particulates and suspended solids can be captured in particular pores, thereby leaving other pores for wastewater to access anode catalyst layer 8. For example, an asymmetrical pore size distribution through anode fluid delivery layer 9 may be employed such that larger pores are created in anode substrate 16 (adjacent filter layer 15) to capture particulates and suspended solids while smaller pores are created in sublayer 17 adjacent anode catalyst layer 8 for fluid flow. Additionally, by employing specific particles and/or nano-particles in sublayer 17 (or sublayers 17), the pore structures can be engineered to increase tortuosity, thus improving fluid flow to and from anode catalyst layer 9. Desired pore sizes may range from, for example, about 2 nanometers to about 10 millimeters. One skilled in the art will appreciate that the pore sizes should be such that delivery of wastewater pollutants to anode catalyst layer 8 and removal of the oxidation products, such as carbon dioxide, nitrogen, oxygen, and hydrogen sulfide, from anode catalyst layer 8 are not substantially diminished.

Preferably, the particles and/or nano-particles employed are electrically conductive and corrosion resistant. In this regard, suitable particles and/or nano-particles include carbides, nitrides, borides, noble & valve metals & metal alloys, metal oxides, graphite, graphene, carbon, and combinations thereof. In some embodiments, if the anode substrate is sufficiently electrically conductive, the particles and/or nano-particles may be inorganic and polymer particles, and optionally in combination with electrically conductive particles, as described in the foregoing. The particles and nano-particles may be spherical in shape for tighter pore size distribution. Desired particle and/or nano-particle sizes may range from about 2 nanometers to about 500 microns.

After prolonged operation, contaminants will accumulate at filter layer 15 and can begin to adversely affect performance if not removed. The build up of contaminants can be detected by monitoring the pressure drop through the anode flow field of the electrolytic cell and when this pressure drop reaches a pre-determined value equivalent to a given cake thickness, it is time to clean the cell.

A number of methods may be used to clean filter layer 15 in-place and remove the filtered and/or electro-adsorbed and/or ion exchanged contaminants. For example, in-situ backwashing, oxygen scouring and chemical cleaning may be performed. To backwash and oxygen scour, an increased voltage or current is applied to anode electrocatalyst layer 8 to oxidize water to oxygen gas, and the resulting gas bubbles pass through anode fluid delivery layer 9 and filter layer 15 from anode electrocatalyst layer 8 to the anode flow field channels, thereby allowing the wash solution to sweep away the contaminants. Additionally, or alternatively, chemical cleaning agents, such as surfactants & other additives may be employed by flowing a solution containing the chemical cleaning agent through the anode flow field channels and increasing the back pressure to ensure the solution passes through filter layer 15 to clean it. In other embodiments, the applied electrode voltage of the electrochemical cell may be used to oxidize the surface contaminants from filter layer 15.

In addition or more specifically, the cleaning methods can comprise one or more of the following in combination:

Adding abrasive particles to the wastewater to mechanically clean the surface. Commercially available particles are available in a wide variety of materials, including ceramics, glass, polymers, and metals. The particle size should be about 2 times greater than the average pore size of the filter layer and less than about ⅓ diameter of the flow field channels. The cleaning particles and solids are both removed as effluent.

Flowing a solution of NaCl through the cell and increase the voltage to 3-3.2V to produce hypochlorite and increase the oxidation of water to produce oxygen bubbles which scour the filter layer.

For chloride containing wastewaters, increasing the voltage to 3-3.2V to produce hypochlorite and increase oxidation of water to produce oxygen bubbles which scour the filter layer. (This method can be used during the oxidation process without adding chemicals so the process is not interrupted.)

Increasing the voltage to >3V to electrolyze water to produce oxygen bubbles to generally scour/backwash the filter layer. (Again, this method can be used during oxidation process without adding chemicals so process is not interrupted.)

In situ backwashing by flowing a solution of NaOH (or other species that dissociates to water) through the cell at a voltage <3V, to dissociate and form water at the anode and increase pressure of fluid at the anode. (The transmembrane pressure is inverted here so that permeate flows back into the feed, lifting the fouling layer from the surface of the membrane.)

Chemical cleaning using detergents, reactive agents such as sodium hypochlorite and acids and alkalis such as citric acid and sodium hydroxide. Caustics and acids are most often used, as caustic removes organic fouling and acid removes minerals. Enzyme solutions are also used in some systems for helping remove organic fouling material from the membrane plant. Regeneration cleaning of ion exchange resins can be accomplished using acids, caustics and/or salt.

Ultrasonic cleaning which dislodges particles from the filter layer and cane be flushed away with water.

Increasing the flow rate or providing a turbulent gas purge, with or without abrasive particles, and flushing with water.

Potentiostatic cleaning by reversing cell polarity, turning off voltage and flowing water or cleaning solutions through the cell, and/or sweeping the voltage.

The following examples are provided to illustrate certain aspects of the invention but should not be construed as limiting in any way.

Examples

A comparative energy efficient electrolytic cell was assembled in accordance with the above description but without any filter layer incorporated in the cell. The anode fluid distribution layer comprised a porous substrate with a filter rating of 75 microns and with pore sizes up to 85 microns in size.

An electrolytic cell of the invention was prepared similar to the comparative cell except that a filter layer was incorporated between the anode flow field plate and the anode fluid distribution layer. The filter layer comprised a commercial material with an essentially unimodal pore size of 21 microns with a maximum pore size of 25 microns.

The electrolytic cells were both supplied with industrial wastewater having a chemical oxygen demand in the range of 1600 to 1700 mg/L (as per Reactor Digestion Method EPA 4101 and SM 5220 D) and a total suspended solids of about 100 mg/L (as per gravimetric, dried at 103-105° C., Method A 160.2 and SM 2540 D).

Both cells were operated under similar conditions, namely at a cell voltage of 2.8V, a current density of 2.5 mA/cm$^2$, and a temperature of 60° C. Wastewater was supplied in a single pass at a flow rate of 2 liters/hour. The pressure drop, dP, through the anode sides of the cells was monitored during operation. The dP through the anode sides of the cells supplied with clean water under these conditions was in the range from 0.37 to 0.38 bar.

After 6 minutes of operation, the dP in the comparative electrolytic cell rose from 0.38 bar to about 0.72 bar. An in-situ cleaning step was performed by flushing the cell with water for 8 minutes. The dP recovered to 0.37 bar. Operation of the cell on wastewater was then continued. After 1 additional minute, the dP rose to 0.48 bar and after 5 additional minutes the dP rose to 0.69 bar.

However, the dP in the inventive electrolytic cell remained much less after a much longer period of continuous operation. The starting dP was 0.37 bar. After 6 minutes of operation, the dP was 0.46 bar. After 15 minutes of operation, the dP was 0.50 bar. After 60 minutes of operation, the dP was 0.52 bar. Testing stopped after 70 minutes, and the dP was still only 0.52 bar.

These examples demonstrate possible improvements in operation using the filter layer of the invention.

While particular embodiments, aspects, and applications of the present invention have been shown and described, it is understood by those skilled in the art, that the invention is not limited thereto. Many modifications or alterations may be made by those skilled in the art without departing from the spirit and scope of the present disclosure. The invention should therefore be construed in accordance with the following claims.

What is claimed is:

1. A solid polymer electrolyte electrolytic cell for energy efficient treatment of polluted wastewater comprising:
an anode comprising an anode catalyst layer and an anode fluid delivery layer wherein the anode catalyst layer comprises an anode catalyst;
an anode flow field plate;
a liquid-electrolyte free cathode comprising a cathode catalyst layer wherein the cathode catalyst layer comprises a cathode catalyst;
a cathode flow field plate;
a solid polymer membrane electrolyte separating the anode and the cathode; and
a filter layer between the anode fluid delivery layer and the anode flow field plate.

2. The solid polymer electrolyte electrolytic cell of claim 1 wherein the anode fluid delivery layer has a flow field side average pore size on the side facing the anode flow field plate, and wherein the average pore size of the filter layer is less than the flow field side average pore size of the anode fluid delivery layer.

3. The solid polymer electrolyte electrolytic cell of claim 2 wherein the filter layer comprises two or more plies and the average pore size of the ply facing the anode flow field plate is smaller than the average pore size of the next adjacent ply.

4. The solid polymer electrolyte electrolytic cell of claim 1 wherein the filter layer comprises a polymer sheet membrane filter.

5. The solid polymer electrolyte electrolytic cell of claim 4 wherein the filter layer comprises a sublayer of electrically conductive particles.

6. The solid polymer electrolyte electrolytic cell of claim 1 wherein the filter layer is electrically non-conductive.

7. The solid polymer electrolyte electrolytic cell of claim 6 wherein the filter layer comprises a polymer.

8. The solid polymer electrolyte electrolytic cell of claim 1 wherein the anode flow field plate is electrically non-conductive.

9. The solid polymer electrolyte electrolytic cell of claim 1 wherein the filter layer comprises adsorption media.

10. The solid polymer electrolyte electrolytic cell of claim 1 wherein the filter layer comprises high surface area oxidation catalyst.

11. The solid polymer electrolyte electrolytic cell of claim 1 wherein the filter layer has an essentially unimodal pore size distribution.

12. The solid polymer electrolyte electrolytic cell of claim 1 wherein the anode fluid delivery layer comprises an anode substrate and at least one sublayer.

13. The solid polymer electrolyte electrolytic cell of claim 12 wherein the anode substrate is a tin-coated metallic or a titanium substrate.

14. The solid polymer electrolyte electrolytic cell of claim 1 wherein the cathode comprises no liquid catholyte nor liquid supporting electrolyte.

15. A system for the treatment of wastewater comprising the solid polymer electrolyte electrolytic cell of claim 1.

16. A method for the energy efficient treatment of polluted wastewater comprising:
providing the solid polymer electrolyte electrolytic cell of claim 1;
supplying a flow of wastewater comprising a pollutant to the anode of the electrolytic cell;
providing a voltage less than about 3 volts across the electrolytic cell wherein the anode is positive with respect to the cathode; and
operating the electrolytic cell at an operating temperature and a current density less than about 20 mA/cm$^2$, thereby degrading the pollutant and generating hydrogen gas at the cathode; and
exhausting the generated hydrogen gas from the cathode.

17. The method of claim 16 wherein the anode fluid delivery layer has a flow field side average pore size on the side facing the anode flow field plate, and wherein the average pore size of the filter layer is less than the flow field side average pore size of the anode fluid delivery layer.

18. The method of claim 16 comprising operating the electrolytic cell at a current density less than about 10 mA/cm$^2$.

19. The method of claim 16 comprising supplying the flow of wastewater to the anode without an added supporting electrolyte.

20. The method of claim 16 comprising removing contaminants from the filter layer using a removal method selected from the group consisting of in-situ backwashing, oxygen scouring, chemical cleaning, ultrasonic cleaning, gas purging, liquid purging, potentiostatic cleaning, flowing water, and generating chlorine and intermediates of oxygen at higher anodic voltages.

* * * * *